(12) United States Patent
Baltzer

(10) Patent No.: US 6,269,954 B1
(45) Date of Patent: Aug. 7, 2001

(54) SEAL FOR ADJOINING SCREEN ASSEMBLIES IN VIBRATING MACHINERY

(75) Inventor: Terry L. Baltzer, Talala, OK (US)

(73) Assignee: Southwestern Wire Cloth, Inc., Tulsa, OK (US)

( * ) Notice: Subject to any disclaimer, the term of this patent is extended or adjusted under 35 U.S.C. 154(b) by 0 days.

(21) Appl. No.: 09/317,385

(22) Filed: May 24, 1999

Related U.S. Application Data

(63) Continuation-in-part of application No. 08/922,205, filed on Sep. 2, 1997, now Pat. No. 5,967,336.

(51) Int. Cl.[7] .................................................. B07B 1/49
(52) U.S. Cl. ........................ 209/405; 209/403; 209/311; 209/309
(58) Field of Search .................................. 210/767, 780, 210/785, 786, 799, 800, 807; 209/309, 311, 403, 405

(56) References Cited

U.S. PATENT DOCUMENTS

| | | |
|---|---|---|
| 1,009,069 | 11/1911 | Hunnicutt . |
| 1,147,279 | 7/1915 | Sweetland . |
| 2,271,900 | 2/1942 | Mowbray ........................ 209/403 |
| 2,335,084 | 11/1943 | Rice ................................ 209/408 |
| 2,576,794 | 11/1951 | Jost et al. ........................ 209/405 |
| 2,870,910 | 1/1959 | Wehner ........................... 209/396 |
| 2,902,165 | 9/1959 | Imershein ....................... 210/486 |
| 2,959,285 | 11/1960 | Tonjes et al. .................... 209/319 |
| 3,012,674 | 12/1961 | Hoppe ............................. 209/401 |
| 3,508,649 | 4/1970 | Kahane et al. .................. 209/323 |
| 3,970,549 | 7/1976 | Ennis et al. ..................... 209/341 |
| 4,360,426 | * 11/1982 | Wetzel ............................ 210/160 |
| 4,380,494 | 4/1983 | Wilson ............................ 209/319 |
| 4,668,394 | 5/1987 | Badolato et al. ............... 210/314 |
| 4,728,422 | 3/1988 | Bailey ............................. 210/314 |
| 4,840,728 | 6/1989 | Connolly et al. ............... 209/405 |
| 5,137,622 | 8/1992 | Souter ............................. 209/403 |
| 5,199,574 | 4/1993 | Hollyfield, Jr. et al. ........ 209/315 |
| 5,248,043 | 9/1993 | Dorn ............................... 209/399 |
| 5,256,291 | 10/1993 | Cagle .............................. 210/499 |
| 5,361,476 | 11/1994 | Leopold .......................... 29/417 |
| 5,385,669 | 1/1995 | Leone, Sr. ...................... 210/488 |
| 5,392,925 | * 2/1995 | Seyffert .......................... 209/405 |
| 5,417,859 | 5/1995 | Bakula ............................ 210/388 |
| 5,636,749 | 6/1997 | Wojciechowski ............... 209/403 |
| 5,950,841 | * 9/1999 | Knox et al. ..................... 209/315 |
| 6,053,329 | * 4/2000 | Ballman ......................... 209/405 |
| 6,070,736 | * 6/2000 | Ballman et al. ................ 209/325 |

FOREIGN PATENT DOCUMENTS

| | | | |
|---|---|---|---|
| 0032436 | 7/1981 | (EP) | ......................... B07B/1/46 |
| 0169698 | 1/1986 | (EP) | ......................... B07B/1/46 |
| 2092917 | 8/1982 | (GB) | ......................... B07B/1/46 |
| 2276572 | 5/1994 | (GB) . | |

\* cited by examiner

*Primary Examiner*—Donald P. Walsh
*Assistant Examiner*—Mark J. Beauchaine
(74) *Attorney, Agent, or Firm*—Head, Johnson & Kachigian

(57) ABSTRACT

A seal for adjoining screen assemblies for vibrating machinery, where each screen assembly has a frame. The frame includes a planar surface. A perforated plate with a plurality of screen cloths thereon is secured to the planar surface of the frame. A first end of the frame has a seal shoulder. A second end of the frame has a seal bracket. The seal bracket of a first screen assembly engages a shoulder of a vibrating screen assembly to form a liquid seal between adjoining frames.

10 Claims, 7 Drawing Sheets

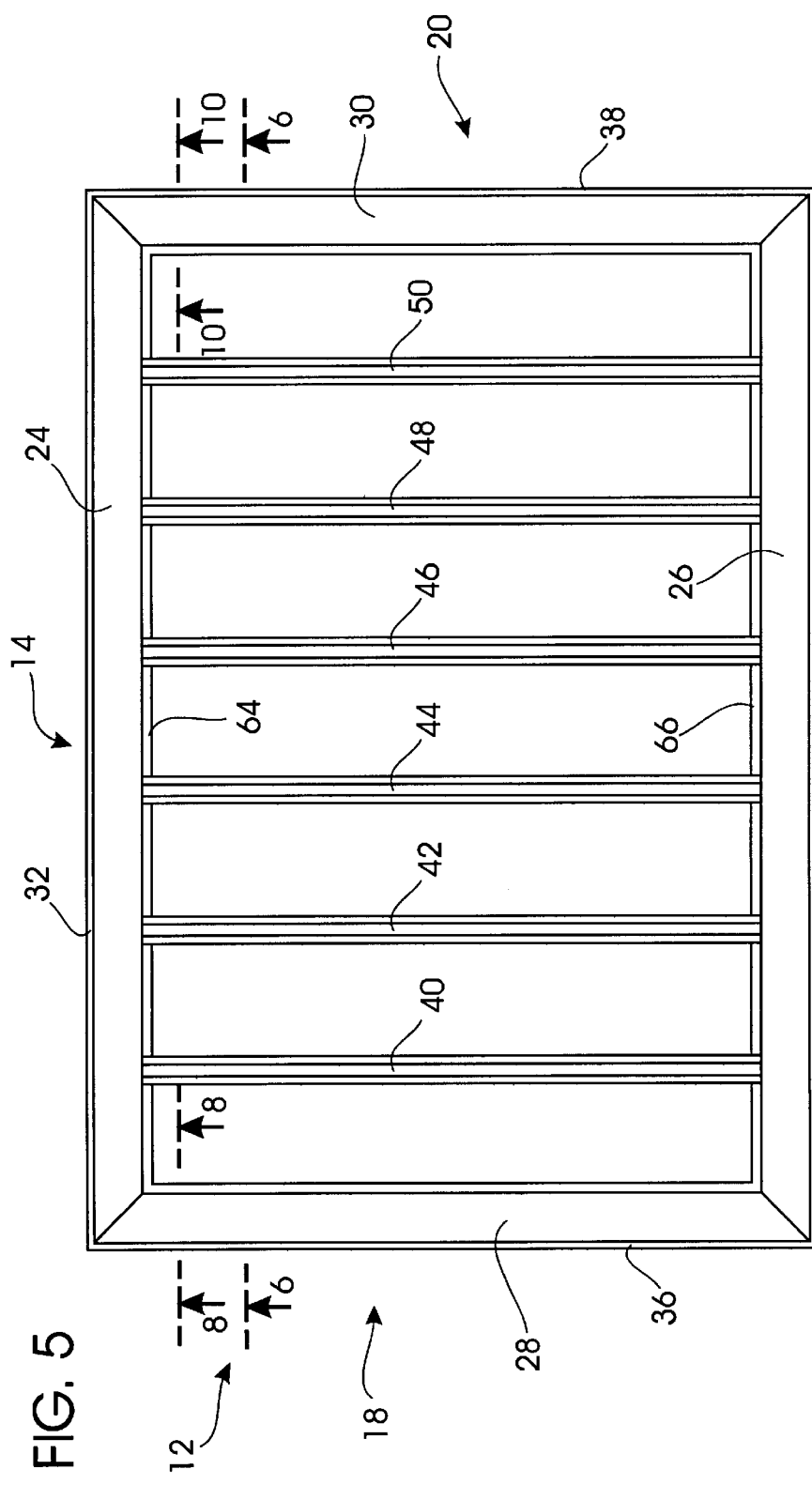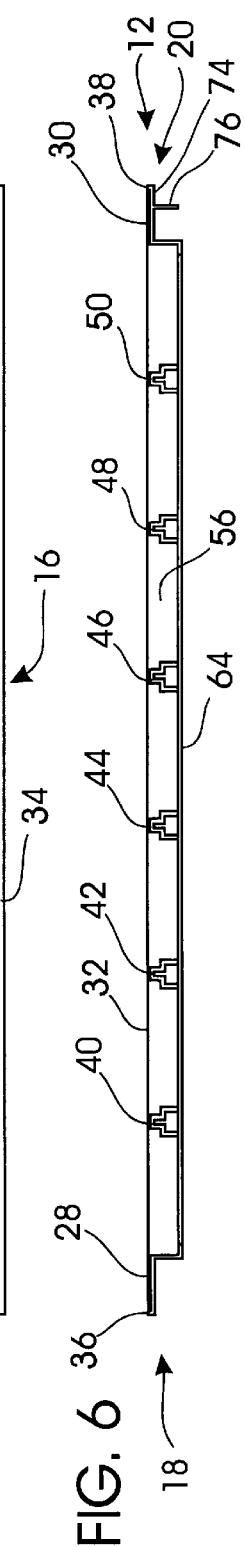

SEAL FOR ADJOINING SCREEN ASSEMBLIES IN VIBRATING MACHINERY

CROSS-REFERENCE TO RELATED APPLICATION

This application is a continuation-in-part of application Ser. No. 08/922,205, filed Sep. 2, 1997 now U.S. Pat. No. 5,967,336 and entitled VIBRATING SCREEN ASSEMBLY WITH IMPROVED FRAME.

BACKGROUND OF THE INVENTION

1. Field of the Invention

The present invention is directed to a seal for adjoining screens used with vibrating machinery. In particular, the present invention is directed to a seal for screen assemblies wherein the seal prevents leakage of fluid between adjoining screen assemblies.

2. Prior Art

Vibrating shakers utilize a screen assembly or a plurality of screen assemblies to separate solid material from liquids and fine solid particles. The screen assembly is typically secured in and to the vibrating machinery through use of a frame. In some cases, a single screen assembly will be utilized while in other cases, a plurality of screen assemblies will be aligned adjacent end-to-end each other. The screen assembly is removably attached to the vibrating shaker. A mixture of materials is delivered or fed to the top of the screen assembly. The screen assembly is vibrated by a motor at a high frequency.

The force of gravity separates the liquid from particles larger than the pore size made up by the combination of layers. This pore size is called the "cut point." The screen assembly may be inclined when secured in the vibrating shaker so that the solids larger than the cut point will move across the screen where they are gathered and disposed of. In other arrangements, one screen assembly is oriented in the shaker in angular relation to the other screen assembly. In each case, the liquid and particles smaller than the cut point pass through the screen assembly and are also collected.

Vibrating shaker machines are often used at remote locations, such as oil and gas well drilling sites. The replacement screen assemblies must, thus, be transported great distances to these remote locations. A relatively lightweight screen assembly is therefore desirable.

Since the screen assembly must be transported and then installed in the field, any sharp edges on the screen assembly should be minimized.

There are various types of screen assemblies having various frames. In one configuration, a plurality of screen cloth layers are attached to a perforated plate which is, in turn, connected to the frame. The perforated plate has a large number of small openings to minimize the unsupported spans of screen cloth. It is important to achieve good adhesion between the perforated plate and the frame. Thus, the frame must have an adequate planar surface to attach securely to the perforated plate.

The screen assembly is subject to tremendous stresses caused by the machinery vibrating it. Additionally, the screen assembly is subject to stresses from the weight of the material to be separated on the top layer of the screen. It is known that the screen assemblies will wear from usage and have a certain useful life, often in hours.

In order to balance screen life with through-put, it has been known to secure multiple layers of wire screen cloth to a perforated panel. The perforated panel is, in turn, secured to the frame. In the manufacturing process, the perforated panel and accompanying screens must be accurately aligned before adhesively bonding to the frame. It would be desirable to provide a self-alignment mechanism to align the perforated plate with the frame.

One problem with existing screen assemblies is that they permit a mixture of liquid and solid particles to flow between adjoining screen frames, thereby allowing the liquid to bypass and frustrate the process described above for separating the mixture into liquid and solid particles.

It is a principal object and purpose of the present invention to prevent leakage of a mixture of liquid and solid particles between adjoining screen assemblies.

It is a principal object and purpose of the present invention to prevent leakage of a mixture of liquid and solid particles between a screen assembly and the vibrating machinery.

It is a further object and purpose of the present invention to provide a replaceable screen assembly for a vibrating shaker that is simple and quick to install and replace.

It is a further object and purpose of the present invention to provide a screen assembly with a seal that will have a maximum useful life while being simple and inexpensive to manufacture.

It is another object and purpose of the present invention to provide a screen assembly having a frame which will position the perforated panel thereon during the assembly process and discourage separation of the frame from the perforated panel.

It is a further object and purpose of the present invention to provide a screen assembly having a strong frame which will provide strength from side to side and provide strength from end to end.

SUMMARY OF THE INVENTION

The present invention is directed to a seal for adjoining screen assemblies having a frame, where the screen assemblies are secured to and used with vibrating machinery. The frame includes a pair of opposed sides, a first opposed end, and a second opposed end. Each opposed side, the first opposed end and the second opposed end have flat planar surfaces. At the first opposed end, a seal shoulder is on top of the first opposed end planar surface. At the second opposed end, an end stop is attached to the frame beneath the planar surface. The seal shoulder of one screen assembly engages the end of another screen assembly to form a seal to prevent liquids from leaking between the two adjoining screens.

In one embodiment of the invention, each opposed side of the frame includes a leg which extends downward perpendicular to the planar surface. Ledges extend perpendicular to the downward legs. The ledges are opposed to each other. The frame also includes a plurality of tubular cross supports which extend between the sides and are parallel to the ends. The tubular cross supports rest on and are attached to the ledges.

A perforated plate is attached and secured to the frame in the assembled condition. The perforated plate includes a plurality of openings which are punched or otherwise formed in the plate. The frame is adhesively secured to the perforated plate. The plate and the accompanying screen cloths are aligned on the frame by the lips which form a rim enclosure.

In order to produce a screen assembly in accordance with the present invention, the sides and ends of the frame are extruded in lengths, such as from extruded aluminum. The frame sections are cut to desired lengths to form the pair of opposed sides and the pair of opposed ends. The sides and ends are cut at 45° angles so that they will mate together to form an exterior frame.

Likewise, lengths of tubular support are extruded, such as from extruded aluminum. Tubular support members are cut from these lengths to the desired dimension. The opposed sides and the opposed ends are clamped together and then tack welded. Thereafter, the entire frame, including the cross supports, is welded together. The joints between the cross supports and the sides of the frame are strengthened since the cross supports rest on the ledges.

The perforated plate is fabricated with hexagonal or other openings and, thereafter, coated with epoxy. Both heat and pressure are used to bond the multiple screen mesh layers to the perforated plate. Accordingly, the perforated plate and the screen cloths are secured together. Thereafter, the perforated plate and the accompanying screen cloths are secured to the frame by glue or other adhesives. The lips form a rim enclosure that aligns the perforated plate and accompanying screen cloths on the frame. The plate is prevented from moving from side to side or end to end with respect to the frame because of the rim enclosure. The lip also provides a blunt, safe edge around the perimeter of the screen assembly which keeps personnel from cutting their hands.

BRIEF DESCRIPTION OF THE DRAWINGS

FIG. 5 is a top view of a frame which is an element of the screen assembly with a seal shown in FIG. 1;

FIG. 6 is a sectional view of the frame taken along section line 6—6 of FIG. 5;

DETAILED DESCRIPTION OF THE PREFERRED EMBODIMENTS

Figure 1:
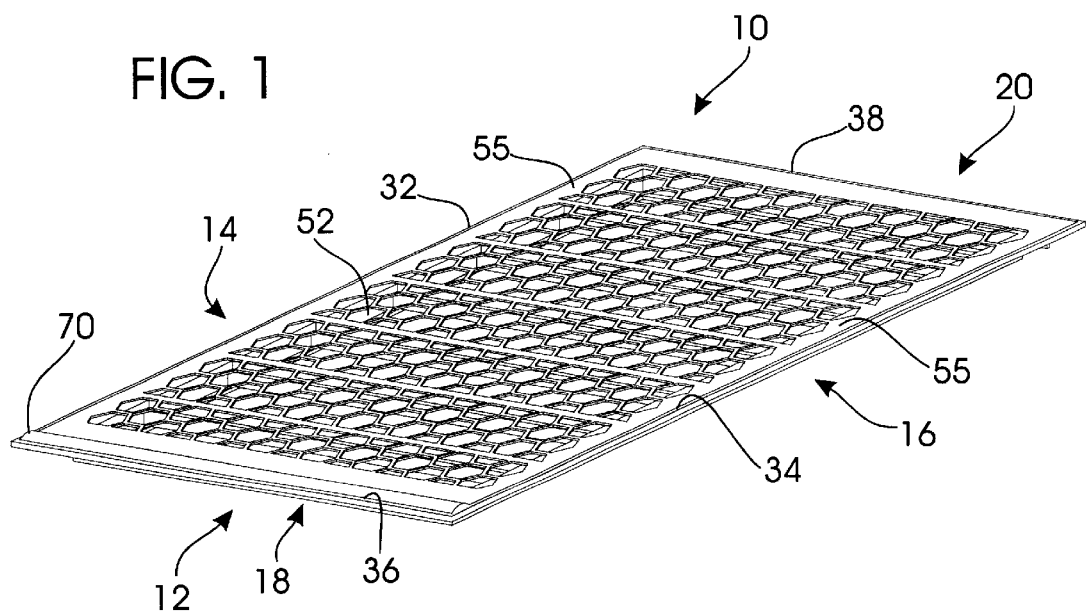
FIG. 1 is a perspective view of a screen assembly incorporating a seal constructed in accordance with the present invention.

Like numbers in various embodiments in the drawings indicate like parts of the invention.

Figure 2:
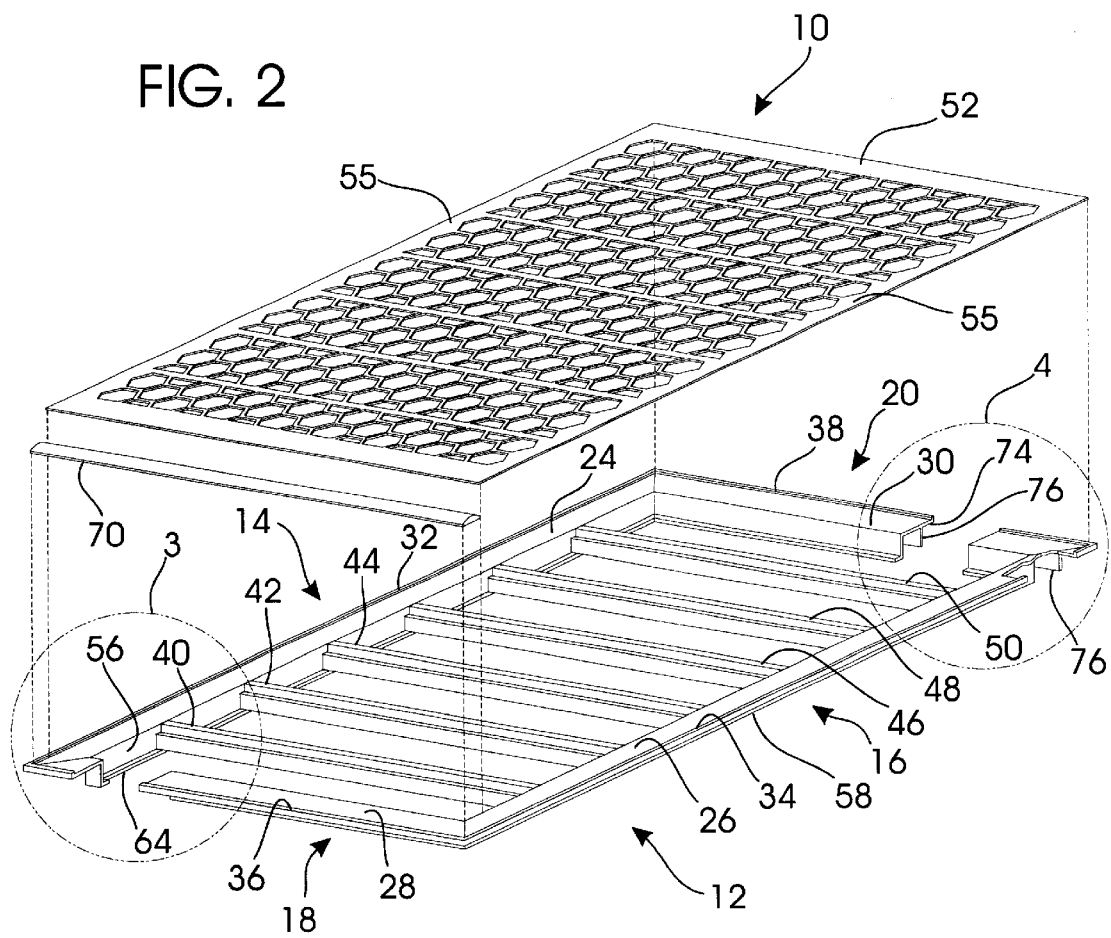
FIG. 2 is an exploded, fragmentary, perspective view of the screen assembly shown in FIG. 1 with a seal of the present invention.
Figure 3:
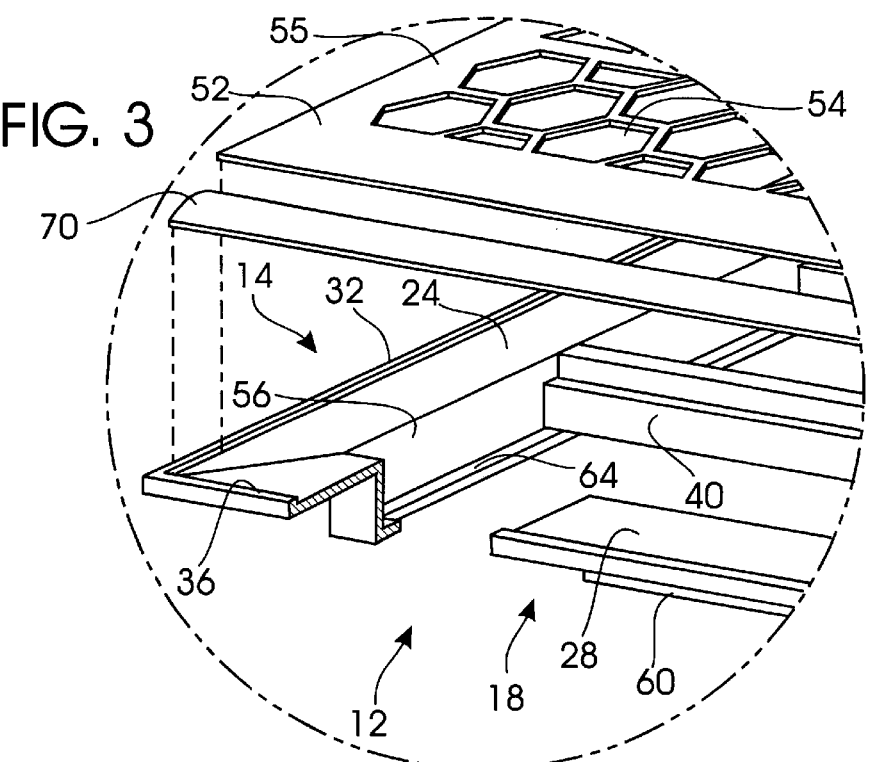
FIG. 3 is an enlarged detailed view of a portion of the screen assembly shown in FIG. 2.

Referring to the drawings in detail, FIGS. 1 and 2 are perspective views of a screen assembly 10 which incorporates a seal mechanism of the present invention. As best seen in FIGS. 1 through 6, a frame 12 includes a pair of opposed sides 14 and 16, a first opposed end 18 and a second opposed end 20. The sides 14 and 16 are opposed and parallel to each other. Likewise, the first opposed end 18 is parallel to second opposed end 20. In the present embodiment, the sides 14 and 16 are all composed of the same extruded aluminum material although other materials are possible.

Figure 12:
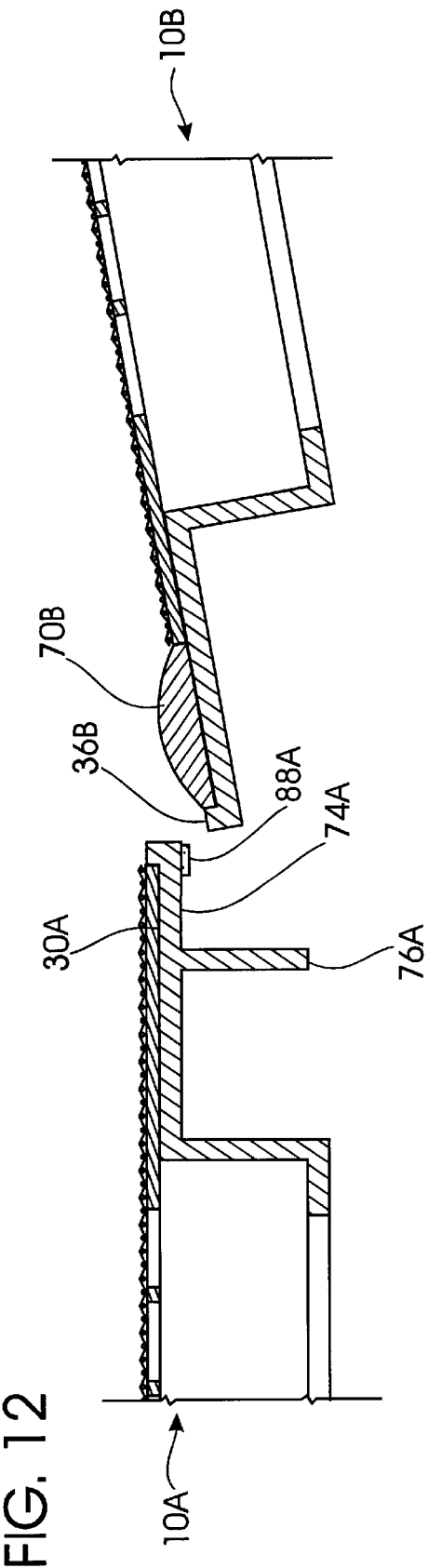
FIG. 12 is a partial side view showing two disengaged screen assemblies, with a seal of the present invention.
Figure 13:
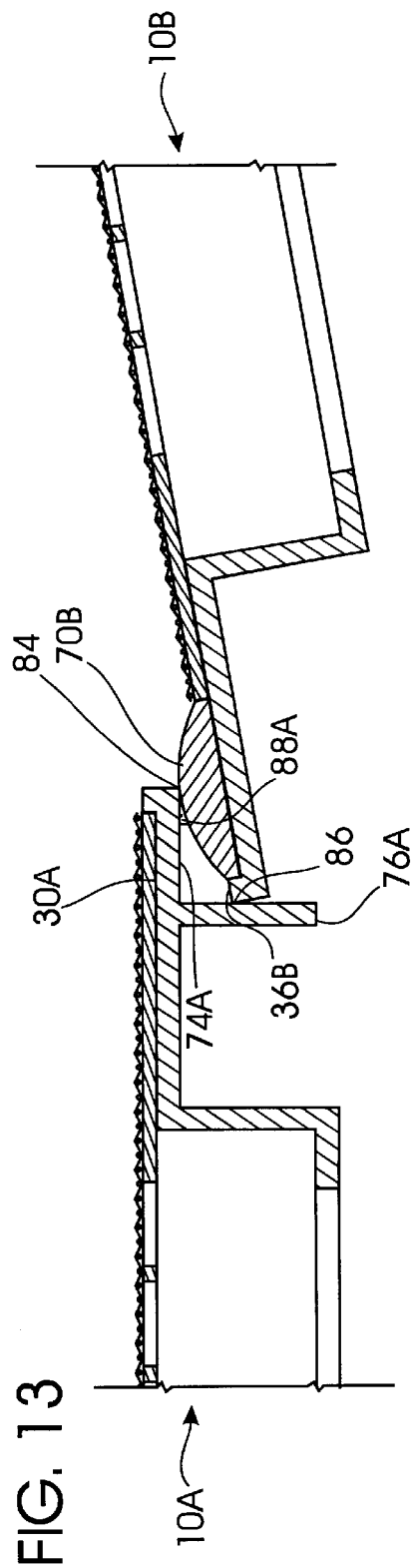
FIG. 13 is a side view showing two engaged screen assemblies, with a seal of the present invention.

The first end 18 has a seal shoulder 70 on top of planar surface 28. The second end 20 has an under surface 74 with an end stop 76. The seal shoulder 70 engages: (1) the vibrating screen machinery (not shown), or (2) an under surface of an adjoining screen assembly, as shown in FIGS. 12 and 13, to be discussed below. The seal mechanism creates a fluid-tight seal to prevent passage of any liquid.

Each side 14 and 16 has a flat, planar surface 24 and 26, respectively. First opposed end 18 has a planar surface 28. Second opposed end 20 has a planar surface 30. The side 14 includes an upstanding lip 32 extending vertically from the planar surface 24. The side 16 includes an upstanding lip 34 extending vertically from the planar surface 26. The first end 18 includes an upstanding lip 36 extending vertically from the planar surface 28. The second end 20 includes an upstanding lip 38 extending vertically from the planar surface 30. The lips 32, 34, 36 and 38 together define a rim enclosure.

The frame 12 also includes a plurality of tubular cross supports 40, 42, 44, 46, 48 and 50. It will be appreciated that a greater or lesser number of tubular supports might be employed. The tubular supports extend between the sides 14 and 16 and are parallel to first opposed end 18 and second opposed end 20. The tubular cross supports 40, 42, 44, 46, 48 and 50 in the present embodiment are narrower at the top than the bottom in cross-section although other configurations are possible within the scope of the invention.

Figure 7:
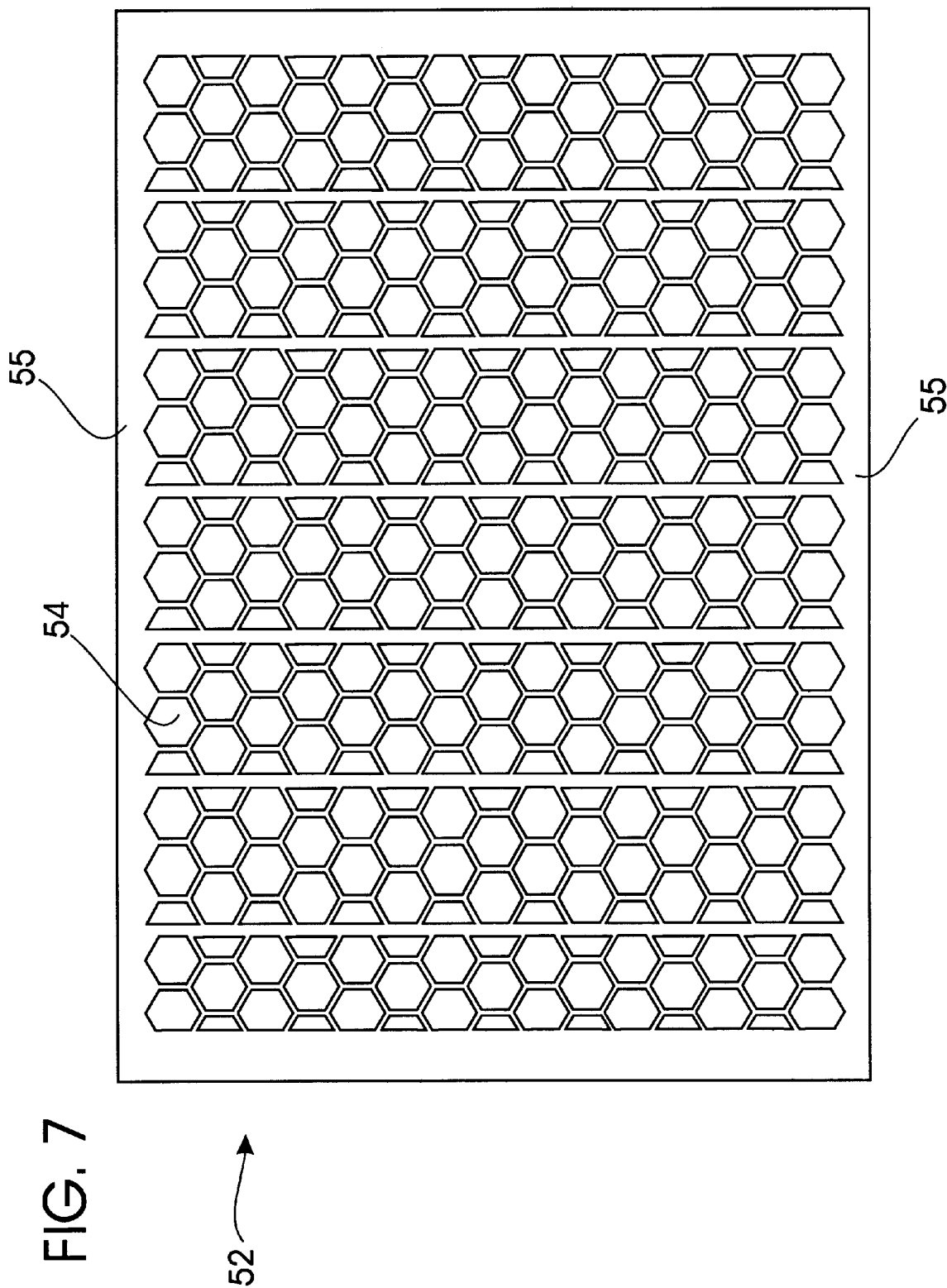
FIG. 7 is a top view of a perforated plate which is an element of the screen assembly with a seal of the present invention.

FIG. 7 illustrates a top view of a perforated plate 52 apart from the screen assembly. Referring briefly to FIGS. 1 and 2, the perforated plate 52 is attached to and secured to the frame 12 in the assembled condition. The perforated plate 52 includes a plurality of openings 54 which are punched or otherwise formed in the plate 52. The support structure for the perforated plate 52 is best shown in FIG. 2. The perforated plate 52 also includes a border area 55 which aligns with the planar surfaces of the frame 12, providing an area for good adhesion between the frame and the plate 52.

Figure 9:
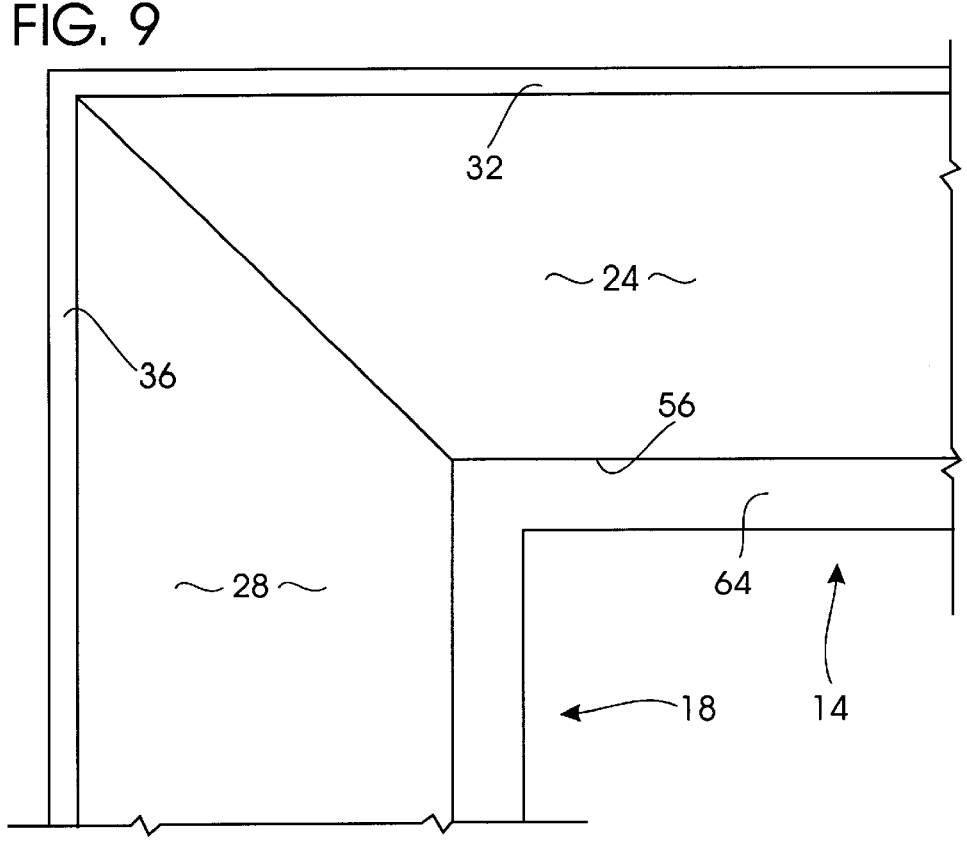
FIG. 9 is a sectional view taken along section line 9—9 of FIG. 8.
Figure 8:
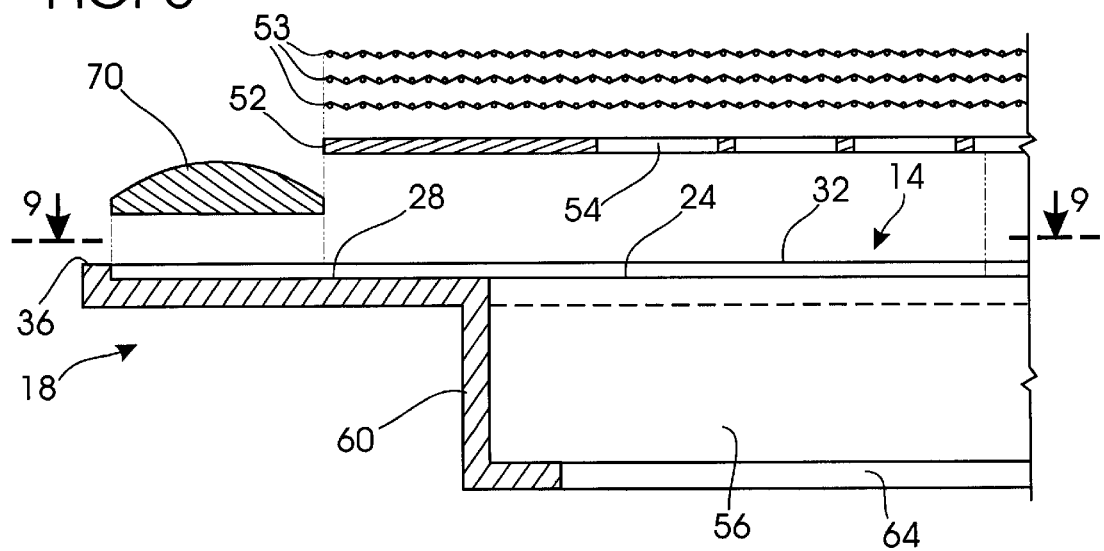
FIG. 8 is a partial, exploded sectional view of the screen assembly with a seal of the present invention taken along section line 8—8 of FIG. 5.

FIGS. 8 and 9 illustrate a partial, sectional views of the frame 12, the perforated plate 52, the seal shoulder 70, and a plurality of screen cloth layers 53. Three screen cloth layers 53 are used in the present embodiment although a greater or lesser number could be utilized. Opposed side 14 includes a downwardly extending leg 56 which extends downward perpendicularly from the planar surface 24 to ledge 64.

As seen in FIGS. 2, 5, 8 and 9, a ledge 64 extends perpendicular to the downward leg 56 of side 14. Likewise, a ledge 66 extends perpendicular to the downward leg 58 of side 16. The ledges 64 and 66 are aligned with and are opposed to each other. The tubular cross supports 40, 42, 44, 46, 48 and 50 each extend between the frame sides 14 and 16. The tubular cross supports 40, 42, 44, 46, 48 and 50 rest on and are connected to both the downwardly extending legs 56 and 58 and the ledges 64 and 66. The ledges 64 and 66 (as well as the legs) facilitate welding of each of the cross supports 40, 42, 44, 46, 48 and 50 to the sides. Once assembled, the tubular cross supports 40, 42, 44, 46, 48 and 50 are aligned with the planar surfaces 24, 26, 28 and 30.

Figure 10:
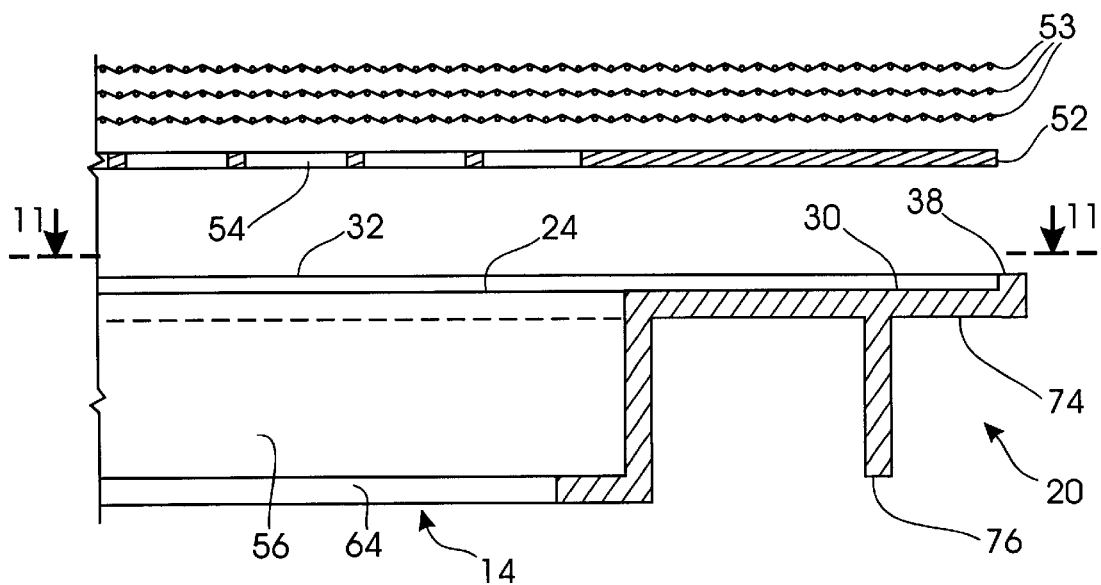
FIG. 10 is a partial, exploded view of a screen assembly with a seal constructed in accordance with the present invention taken along section line 10—10 of FIG. 5.

FIG. 10 illustrates a partial sectional view of the end 20 including the end stop 76. The frame 12 is adhesively secured to the perforated plate 52 with adhesive. The plate 52 and the accompanying screen cloths 53 are aligned on the frame by the lip 38, which forms a rim enclosure with the lips 32, 34, and 36.

Figure 11:
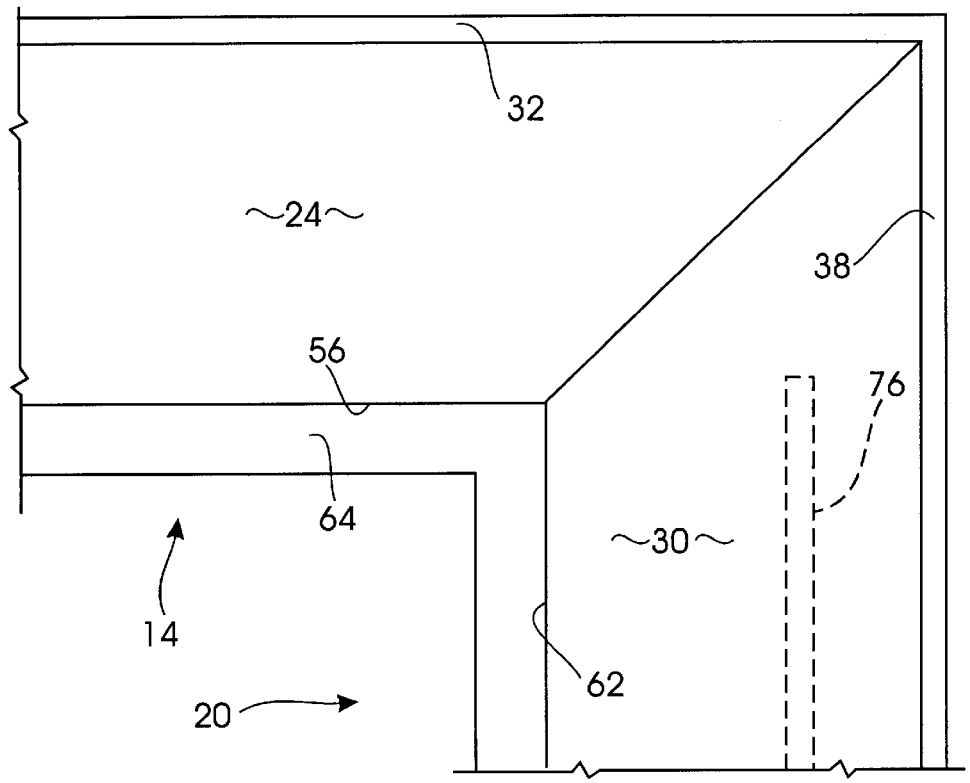
FIG. 11 is a sectional view taken along section line 11—11 of FIG. 4.

FIG. 11 is a cross-sectional view taken along lines 11—11 of FIG. 10. Tubular cross supports 48 and 50 are positioned between side planar surface 24 and ledge 64.

FIGS. 12 and 13 show the engagement of adjoining screen assemblies 10A and 10B for use in vibrating machinery that accommodates such adjoining screen assemblies. FIG. 12 shows the two vibrating screen assemblies 10A and 10B prior to engagement. The seal shoulder 70B is inserted underneath the planar surface 30A until it reaches the end stop 76A. FIG. 13 shows the completed installation with the seal shoulder 70B engaging the seal bracket 74A at an engagement line 84. The lip 36B engages the end stop 76A at stop segment 86. The stop segment 86 locates the seal shoulder properly to create a seal at the engagement line. It will be understood that it is possible to create a seal without the end stop.

A rubber gasket 88A helps to minimize gaps between the seal shoulder 70B and undersurface 74 of the end caused by the vibration of the screen assemblies 10A and 10B in the vibrating machinery. The installed adjoining screen assemblies 10A and 10B are not aligned but have an angle between them, typically about 10 degrees.

The process for producing a seal and screen assembly 10 of the present invention includes a number of steps. Initially, the sides 14 and 16 and ends 18 and 20 of the frame 12 are extruded in lengths, such as from extruded aluminum. This extrusion process uses three different dies, as described below. These frame sections are then cut to desired lengths to form a pair of opposed sides 14 and 16, a first end 18 and a second end 20. The sides may be of the same frame design. The sides and the ends are cut at 45° angles (as best seen in FIG. 5) so that they will mate together to form an exterior frame. The rubber gasket 88A is glued to the seal bracket 74.

For the embodiments shown in FIGS. 2 and 8, the seal shoulder 70 is rigidly attached to the planar surface 28 by adhesive. However, in an alternate embodiment, the seal shoulder 70 may be extruded as an integral part of the opposed end 18. The seal shoulder 70 is convex and extends above the level of the planar surface. Other configurations, such as a seal shoulder with a peaked cross-section, are possible.

Figure 4:
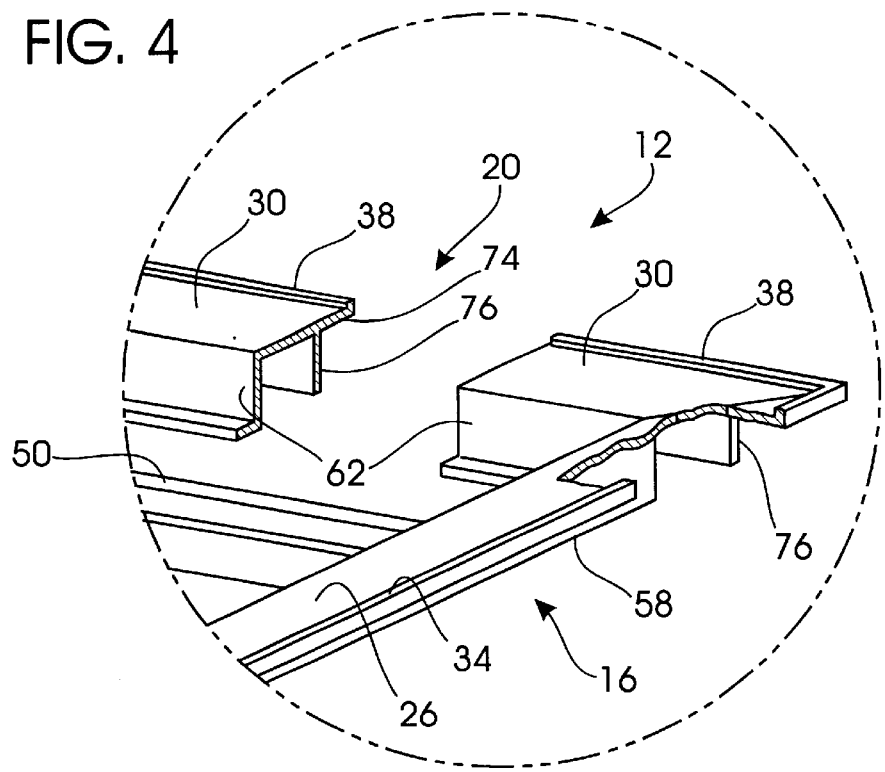
FIG. 4 is an enlarged detailed view of a portion of the screen assembly shown in FIG. 2.

As best seen in FIGS. 4 and 10, the end stop 76 is extruded as an integral part of the opposed end 20. Thus, to make the parts of the frame by extrusion, there will be three extrusion dies, one die for the opposed sides 14 and 16, one die for opposed end 18, and one die for opposed end 20.

Likewise, lengths of tubular support are extruded, such as from extruded aluminum. The tubular cross supports 40, 42, 44, 46, 48 and 50 are cut from these lengths to the desired dimensions. The opposed sides 14 and 16, the first opposed end 18 and the second opposed end 20 are clamped together and welded. Thereafter, the entire frame 12, including the cross supports, is welded together. As previously described, end of the tubular cross supports 40, 42, 44, 46, 48 and 50 rest on the ledges 64 and 66. The connecting weld points may require some minor surface grinding for a smooth finish.

In usage on vibrating screen machinery, the perforated plate 52 is prevented from moving side to side or end to end with respect to the frame 12 because of the rim enclosure. The joints between the tubular cross supports 40, 42, 44, 46, 48 and 50 and the opposed sides 14 and 16 are strengthened because the tubular cross supports 40, 42, 44, 46, 48 and 50 rest on the ledges 64 and 66. Accordingly, only an upward force would act to separate the cross supports 40, 42, 44, 46, 48 and 50 from the opposed sides 14 and 16.

Whereas, the present invention has been described in relation to the drawings attached hereto, it should be understood that other and further modifications, apart from those shown or suggested herein, may be made within the spirit and scope of this invention.

What is claimed is:

1. A seal mechanism between adjoining screen assemblies for vibrating machinery, in order to prevent leakage of liquids between the screen assemblies, the assemblies comprising:

a first and second screen assembly, each screen assembly having a frame, a first opposed end and a second opposed end, comprising:

a plurality of screen cloths supported on a planar surface of said frame;

a first seal bracket on an underside of said second opposed end of said first screen assembly including an end stop extending vertically from said underside;

a second seal bracket on an underside of said second opposed end of said second screen assembly including an end stop extending vertically from said underside;

a convex first seal shoulder on said planar surface first opposed end of said first screen assembly;

a convex second seal shoulder on said planar surface first opposed end of said second screen assembly; and said seal shoulder engaging said bracket to prevent leakage of liquids between the screen assemblies.

2. The seal mechanism of claim 1 wherein said first seal shoulder is adhered to said first opposed end of said first screen assembly and said second seal shoulder is adhered to said first opposed end of said second screen assembly.

3. The seal mechanism of claim 2 wherein said first seal shoulder and said second seal shoulder are each formed by extrusion.

4. The seal mechanism of claim 2 wherein said first seal shoulder and said second seal shoulder are each formed by machining.

5. The seal mechanism of claim 1 wherein said first seal shoulder is integral to said first opposed end of said first screen assembly, said second seal shoulder is integral to said first opposed end of said second screen assembly, said first seal bracket is integral to said second opposed end of said first screen assembly, and said second seal bracket is integral to said second opposed end of said second screen assembly.

6. The seal mechanism of claim 1 wherein said first screen assembly is engaged with said second screen assembly in angular relationship.

7. The seal mechanism as set forth in claim 1 wherein each screen assembly has a frame and each said seal bracket has an end stop vertical to its respective fame.

8. The seal mechanism of claim 1 wherein a rubber gasket is glued to said first bracket and said second bracket.

9. A process to produce a screen assembly for use with vibrating machinery, which process comprises:

extruding sides of a frame having a top planar surface for supporting a plurality of screen lacers and an opposed inwardly extending ledge;

extruding a first opposed end of said frame;

extruding a second opposed end of said frame having a seal bracket extending vertically from an underside of said frame;

cutting said sides and ends of said frame to desired lengths at 45° angles;

connecting said opposed sides, a first opposed end and a second opposed end together to form a frame;

connecting a plurality of tubular cross supports to said frame sides;

bonding a plurality of screen cloths to a perforated plate; and securing said perforated plate, said screen cloths and a convex seal shoulder to said top planar surface frame.

10. The process for producing a screen assembly of claim 9 which further comprises gluing a rubber gasket to said seal bracket.

* * * * *

UNITED STATES PATENT AND TRADEMARK OFFICE
CERTIFICATE OF CORRECTION

PATENT NO. : 6,269,954 B1
DATED : August 7, 2001
INVENTOR(S) : Terry L. Baltzer

It is certified that error appears in the above-identified patent and that said Letters Patent is hereby corrected as shown below:

<u>Column 6,</u>
Line 59, the word "fame" should be -- frame --;
Line 65, the word "lacers" should be -- layers --.

Signed and Sealed this

Twenty-sixth Day of February, 2002

*Attest:*

*Attesting Officer*

JAMES E. ROGAN
*Director of the United States Patent and Trademark Office*